United States Patent Office 3,463,858
Patented Aug. 26, 1969

3,463,858
ORGANIC ZINC FEED ADDITIVE AND METHOD
OF MAKING SAME
Dean R. Anderson, Des Moines, Iowa
(1947 Elmhurst Drive, Elkhart, Ind. 46514)
No Drawing. Continuation-in-part of application Ser. No. 373,049, June 5, 1964. This application May 6, 1965, Ser. No. 453,808
Int. Cl. A23k 1/16
U.S. Cl. 424—289       27 Claims

ABSTRACT OF THE DISCLOSURE

Process for making feed additive including inorganic zinc growth factor by slurrying a mixture of an amino acid source and a water soluble zinc salt in water heating, acidifying and drying the slurry.

---

This application is a continuation-in-part of my co-pending application Ser. No. 373,049 filed June 5, 1964, now abandoned.

The feeding of animals and poultry on farms and ranches today is a highly scientific operation. The basic feeds available today do not differ substantially from the past, but many feed additives have been developed to stimulate growth, retard disease, and to achieve other such desirable results. This invention relates to a feed additive that serves as a growth factor when utilized with conventional feeds. More specifically, this invention relates to the use of inorganic forms of zinc combined directly with a suitable source of amino acids or other organic reactants to create a growth factor which will accelerate the growth of the animals and poultry, and which will also increase the feeding efficiency of the animal involved in terms of weight produced per pound of feed.

Therefore, a principal object of this invention is to provide a feed additive to stimulate animal growth which comprises at least in part the combination of a zinc salt and a suitable source of amino acids.

A further object of this invention is to provide a feed supplement containing high and exacting amounts of organic zinc that will provide a more beneficial zinc fortification for animal feeds than will inorganic zinc compounds.

A still further object of this invention is to provide a feed additive containing precise amounts of organic zinc that will stimulate animal growth without adversely affecting the animal's general health or the quality of the meat produced.

A still further object of this invention is to provide a method for making a feed additive containing precise amounts of organic zinc which is economical of manufacture, and which can utilize such economical carriers as distillers fermentation solubles.

A still further object of this invention is to carefully control the pH of the mixture to fully achieve the desired chemical reaction, and at the same time to provide a stable substance that can be easily dried, and which will not damage the mixing equipment being used.

These and other objects will be apparent to those skilled in the art.

Organic forms of zinc are found in trace amounts in many grain feeds, but while zinc has been recognized as affecting animal growth, it heretofore has not been known how to efficiently and effectively add zinc to feed to create a desired result. Efforts to use inorganic zinc alone to stimulate growth have proven to give inconsistent results. This invention results from the novel determination that recognizable growth factors can be developed through the direct combination of zinc salts with amino acids, and it is this combination that creates the useful organic zinc compounds.

The preferred zinc salt to be used in the process and product of this invention is zinc chloride, for it freely permits the zinc to combine with the amino acids, (to be discussed hereafter) to create the desired organic zinc compounds. Other water soluble zinc salts, such as zinc sulfate ($ZnSo_4$), zinc carbonate ($ZnCo_3$), zinc acetate ($Zn[C_2H_3O_2]_2$), or zinc oxide ($ZnO$) can be used if the pH of the slurry is carefully controlled to enable the zinc to chemically combine with the organic material involved.

The source of amino acids with which the zinc salts are combined can be varied to some degree. Amino acids are particularly useful since their relatively small molecular size enables them to accept a relatively large amount of zinc, as contrasted to certain antibiotics which are also to some extent instable. Proteins provide a source of amino acids, and a preferred source is distillers fermentation solubles. "Solulac" is a commercially prepared fermentation product. Solulac is the dried residue of the yeast fermentation of corn-type mash in the production of grain neutral spirits or alcohol, and is comprised of 70 percent distillers solubles and 30 percent dried grains to prevent caking. Reference is made to the following table which sets forth the average analysis of Solulac and the average amino acid assay thereof:

Average analysis

| | | |
|---|---|---|
| Protein | percent | 26 |
| Fat | do | 3 |
| Fiber | do | 8 |
| Ash | do | 7 |
| Calcium | do | 0.25 |
| Phosphorous | do | 0.80 |
| Riboflavin | mgs./lb. | 8 |
| Pantothenic acid | mgs./lb. | 8 |
| Niacin | mgs./lb. | 50 |
| Choline | mgs./lb. | 2,000 |

Average Amino Acid Assay

| | | (Per lb.) |
|---|---|---|
| Arginine | 1.00% | 4.54 gm. |
| Histidine | 1.00% | 4.54 gm. |
| Isoleucine | 2.00% | 9.08 gm. |
| Leucine | 2.50% | 11.35 gm. |
| Lysine | 0.85% | 3.86 gm. |
| Methionine | 0.30% | 1.36 gm. |
| Tryptophane | 0.25% | 1.14 gm. |
| | 7.90% | 35.87 gm. |

Other possible substitutes for distillers fermentation solubles are as follows:

(1) Non-antibiotic fermentation residue
(2) Feed grains (such as corn, oats, soybeans, wheat, barley)
(3) Animal, poultry and fish by-products meal
(4) Distillers molasses solubles
(5) Whey
(6) Yeast products
(7) Amino acids
   A. Methionine
   B. Lysine
   C. Arginine
   D. Cystine
   E. Tryptophane
   F. Leucine
   G. Isoleucine
(8) Fish solubles
(9) Feather meal
(10) Distillers grains
(11) Corn gluten feed and meal
(12) Brewers dried grains
(13) Peanut oil meal
(14) Milk by-products
(15) Oil seed residue
(16) Casein The zinc salt is combined with the amino acid source in the presence of warm water to cause a reaction between the inorganic zinc and the amino acids. A preferred formula is as follows, with the proportions of the various ingredients being illustrated by their respective weights:

| Ingredient: | Weight, grams |
|---|---|
| Solulac (dry powder) | 2375 |
| ZnCl$_2$ (in crystalline form) | 625 |
| Total | 3000 |

The above list of substitutes for fermentation solubles can be substituted for the Solulac in the same proportions outlined above, except when pure amino acids are used (items 7A to 7G), the ZnCl$_2$ and acid can be used in equal amounts. To this mixture is added between 2375 and 9500 grams of warm water to provide not less than a 1 to 1 ratio and not more than a 4 to 1 ratio by weight between the water and Solulac, respectively. The water should be in the range of 60 to 70 degrees centigrade, and is preferably at approximately 65 degrees. The pH of the mixture of Solulac and ZnCl$_2$ automatically drops to approximately 3.5 which is the level at which the zinc can best attach itself to the amino acid source. If ZnO is used in the above formula, it is necessary to add sufficient HCl to lower the pH to the 3.5 level. After the pH of the mixture has been lowered as indicated above, a quantity of NaCO$_3$ is then added to the above formula in the amount of approximately 90 grams to raise the pH of the mixture upwardly to approximately 7.0. NaOH could also be used to raise the pH of the mixture. The raising of the pH retards the detrimental effects of the acid on the mixing equipment, serves to make it easier to dry the mixture, and it also stabilizes the organic zinc.

After these components are properly mixed, the resulting slurry is then dried by any convenient means to a point where its moisture content is between 2 to 8 percent by weight. The 3000 grams of slurry (excluding the weight of the water) will yield between 6.28 and 6.61 pounds of organic zinc compound when dried.

The successful creation of valuable growth factor by the above product was illustrated by a thirty-day test of two groups of small pigs who were all litter mates who were equally divided by weight with the same number of males and females in each group. Both groups of ten pigs each were fed the same basal ration, which consisted of the following:

Basal ration

| | Lbs. |
|---|---|
| Corn | 1255 |
| Dried skim milk | 100 |
| Whey | 200 |
| Soybean meal | 390 |
| Phosphate | 25 |
| Vitamin premix[1] | 50 |
| Salt | 5 |
| Trace mineral[2] | 1 |
| | 2026 |

[1] Vitamin premix guaranteed analysis:
| | |
|---|---|
| Crude protein, not less than | percent 34 |
| Crude fat, not less than | do 1.5 |
| Crude fiber, not more than | do 4.0 |
| Vitamin A | USP units/lb 100,000 |
| Vitamin D$_3$ | do 20,000 |
| Riboflavin | mg./lb 160 |
| Niacin | mg./lb 800 |
| d-Pantothenic acid | mg./lb 250 |
| Vitamin B$_{12}$ | mg./lb 0.4 |
| Choline chloride | mg./lb 1,000 |

Ingredients.—Condensed fish solubles dried on soybean meal, dried whole whey, vitamin A palmitate, vitamin D$_3$ Supplements, folic acid supplement, choline chloride, calcium pantothenate.

[2] Trace mineral guaranteed analysis:
| | Percent (not less than) |
|---|---|
| Iron | 6.00 |
| Manganese | 11.00 |
| Zinc | 15.00 |
| Copper | 1.00 |
| Cobalt | 0.10 |
| Iodine | 0.30 |
| Calcium | 10.20 |
| Calcium | 8.50 |

Ingredients.—Manganous oxide, iron carbonate, copper oxide, zinc oxide, cobalt carbonate, calcium carbonate, potassium iodide.

Nine pounds of "Solulac" (Distillers Fermentation Solubles) were added to the basal ration for Group No. I. and 4.33 pounds of Solulac plus additive were added to the basal ration of Group No. II. The results of this typical 30 day test are reflected in the following table.

| | Group I | Group II |
|---|---|---|
| Number of pigs | 10 | 10 |
| Average weight, day #1 | 15.45 | 15.40 |
| Average weight, day #30 | 17.95 | 20.30 |
| Total pounds gained, 30 days | 25 | 49 |

The weight gain of Group II over Group I represents an increase of 93 percent. Similarly, the feeding efficiency (pounds gained per pound of feed consumed) was 98 percent improved by Group II over Group I.

Tests of the type illustrated above conclusively establish that the direct combination of zinc salts with amino acids, or proteins containing amino acids under the conditions stated, creates significant growth factors of organic zinc compounds which successfully accelerates animal growth and development. As such, it is seen that this invention at least achieves its stated objectives.

Various changes and modifications may be made in carrying out the present invention, Organic Zinc Feed Additive and Method of Making Same, without departing from the spirit and scope thereof. Insofar as these changes and modifications are within the purview of the annexed claims, they are to be considered as part of my invention.

I claim:
1. The process of making a feed additive including an organic zinc growth factor, comprising,
   the taking of a material source containing an amino acid,
   adding a water-soluble zinc salt to said amino acid source,
   forming a slurry by adding a quantity of water heated to approximately 60 to 70 degrees centigrade to the mixture of said zinc salt and said amino acid source to chemically link the zinc of said zinc salt to said amino acid source, the ratio by weight between the water and amino acid source being between 1 to 1 and 4 to 1, lowering the pH of said slurry to at least an acid condition by adding HCl thereto.

and the drying of said resulting slurry.

2. The process of claim 1 wherein said amino acid source is a protein.

3. The process of claim 1 wherein said amino acid source is a protein being free from any antibiotic properties.

4. The process of claim 1 wherein said amino acid source is comprised of distillers fermentation solubles.

5. The process of claim 1 wherein said zinc salt is zinc chloride.

6. The process of claim 1 wherein said amino acid source is selected from the group consisting of distillers fermentation solubles; non-antibiotic fermentation residue; feed grains comprising corn, oats, soybeans, wheat, barley; animal, poultry and fish by-products meal; distillers molasses solubles; whey; yeast products; corn gluten feed and meal; peanut oil meal; oil seed residue; casein; and amino acids such as methionine, lysine, arginine, cystine, tryptophane, leucine and isoleucine.

7. The process of claim 1 wherein said zinc is selected from a group consisting of zinc chloride, zinc sulphate, zinc carbonate, zinc acetate, and zinc oxide.

8. The process of claim 1 wherein said amino acid source is comprised of distillers fermentation solubles, and said zinc salt is zinc chloride.

9. The process of claim 1 wherein said amino acid source is selected from the group consisting of distillers fermentation solubles, non-antibiotic fermentation residue, feed grains selected from the group consisting of corn, oats, soybeans, wheat, barley; animal, poultry and fish by-products meal; distillers molasses solubles; whey; yeast products; corn gluten feed and meal; peanut oil meal; oil seed residue; casein; and amino acids selected from the group consisting of methionine, lysine, arginine, cystine, tryptophane, leucine and isoleucine; and said zinc salt is selected from the group consisting of zinc chloride, zinc sulphate, zinc carbonate, zinc acetate, and zinc oxide.

10. A feed additive product comprising an organic material source derived from the combination of a zinc salt and an amino-acid carrying protein which is free from any antibiotic properties, said amino-acid carrying protein being selected from the group consisting of distillers fermentation solubles, non-antibiotic fermentation residue; feed grains selected from the group consisting of corn, oats, soybeans, wheat, barley; animal, poultry and fish by-products meal; distillers molasses solubles; whey; yeast product, corn gluten feed and meal, peanut oil meal; oil seed residue; casein; and amino acids selected from the group consisting of methionine, lysine, arginine, cystine, tryptophane, leucine and isoleucine.

11. A feed additive product comprising an organic zinc material source derived from the combination of a zinc salt and an amino-acid carrying protein which is free from any antibiotic properties, said amino-acid carrying protein being selected from the group consisting of distillers fermentation solubles; non-antibiotic fermentation residue; feed grains selected from the group consisting of corn, oats, soybeans, wheat, barley; animal, poultry and fish by-products meal; distillers molasses solubles; whey; yeast products, corn gluten feed and meal, peanut oil meal; casein; oil seed residue; and amino acids selected from the group consisting of methionine, lysine, arginine, cystine, tryptophase, leucine and isoleucine and said zinc salt is one from a group of zinc chloride, zinc sulphate, zinc carbonate, zinc acetate, and zinc oxide.

12. The process of making a feed additive including an organic zinc growth factor, comprising, the taking of four parts by weight of a material source containing an amino acid, adding one part by weight of a water soluble zinc salt to said amino acid source, fomring a slurry by adding a quantity of water heated to approximately 60 to 70 degrees centigrade to the mixture of said zinc salt and said amino acid source to chemically link the zinc of said zinc salt to said amino acid source, lowering the pH of said slurry to at least an acid condition by adding HCl thereto, and the drying of said resulting slurry.

13. The process of claim 12 wherein said water is between 60 and 70 degrees centigrade.

14. The process of claim 12 wherein said slurry is dried to a point where it contains between 2 and 8 percent moisture by weight.

15. The process of making a feed additive including an organic zinc growth factor, comprising, the taking of a material source containing an amino acid, adding a water-soluble zinc salt to said amino acid source, forming a slurry by adding a quantity of water heated to approximately 60 to 70 degrees centigrade to the mixture of said zinc salt and said amino acid source, the ratio by weight between the water and amino acid source being between 1 to 1 and 4 to 1, lowering the pH of said slurry to an acid condition by adding HCl thereto to permit the zinc of said zinc salt to become chemically linked to said amino acid source, and the drying of said resulting slurry.

16. The process of claim 15 wherein the pH of said slurry is lowered to approximately a value of 3.5.

17. The process of claim 15 wherein the pH of said slurry is raised after it has first been lowered to permit the chemical reaction between said zinc salt and acid source to take place.

18. The process of making a feed additive including an organic zinc growth factor, comprising, taking an amino acid source having a pH above 3.5, adding a water-soluble zinc salt having a pH above 3.5 to said amino acid source, forming a slurry by adding a quantity of water to the mixture of zinc salt and said amino acid source and lowering the pH of the slurry to approximately 3.5 by adding HCl thereto to permit the zinc of said zinc salt to become chemically linked to said amino acid source, the ratio by weight between the water and amino acid source being between 1 to 1 and 4 to 1, and the drying of said resulting slurry.

19. The process of claim 18 wherein the pH of said slurry is raised above 3.5 before it is dried.

20. The process of claim 18 wherein the pH of said slurry is raised to approximately 7.0 before it is dried.

21. The process of claim 18 wherein said amino acid source is fermentation solubles and said zinc salt is $ZnCl_2$.

22. The process of claim 18 wherein the original pH of the amino acid source is approximately 4.6 and the pH of said zinc salt is approximately 6.4.

23. The process of claim 22 wherein the ratio by weight between said amino acid source and said zinc salt is approximately 4 to 1.

24. The process of claim 18 wherein the ratio by weight between said amino acid source and said zinc salt is approximately 4 to 1.

25. The process of claim 18 wherein a substantially pure amino acid is used as the amino acid source, and $ZnCl_2$ is used as a zinc salt, said amino acid and said zinc salt being present in substantial equal quantities by weight.

26. The process of claim 18 wherein a quantity of

NaCO₃ or NaOH is added to the slurry before drying to raise the pH thereof to approximately 7.0.

27. The process of claim 18 wherein the zinc salt is ZnO.

References Cited

UNITED STATES PATENTS

| | | | |
|---|---|---|---|
| 820,824 | 5/1906 | Roehr | 99—5 |
| 2,344,229 | 3/1944 | Block et al. | 99—2 |
| 2,973,265 | 2/1961 | Gillis | 99—2 |

RAYMOND N. JONES, Primary Examiner

J. M. HUNTER, Assistant Examiner

U.S. Cl. X.R.

99—2, 5